(12) United States Patent
Caillaud et al.

(10) Patent No.: US 7,493,196 B2
(45) Date of Patent: Feb. 17, 2009

(54) ON-BOARD FLIGHT MANAGEMENT SYSTEM FOR AIRCRAFT

(75) Inventors: Christophe Caillaud, Blagnac (FR); Vincent Jacquier, Blagnac (FR)

(73) Assignee: Thales (FR)

( * ) Notice: Subject to any disclaimer, the term of this patent is extended or adjusted under 35 U.S.C. 154(b) by 376 days.

(21) Appl. No.: 10/544,839

(22) PCT Filed: Feb. 20, 2004

(86) PCT No.: PCT/EP2004/050179

§ 371 (c)(1),
(2), (4) Date: Aug. 8, 2005

(87) PCT Pub. No.: WO2004/085964

PCT Pub. Date: Oct. 7, 2004

(65) Prior Publication Data

US 2006/0142904 A1    Jun. 29, 2006

(30) Foreign Application Priority Data

Mar. 28, 2003  (FR) .................................. 03 03894

(51) Int. Cl.
*G01C 23/00* (2006.01)
*G05D 1/00* (2006.01)

(52) U.S. Cl. ........................... 701/3; 244/1 R; 244/221; 244/75.1; 340/972; 340/973; 701/4; 701/14; 701/200

(58) Field of Classification Search .................. 701/3–4, 701/201–202, 206, 14, 224; 244/75.1, 1 R, 244/221; 340/972–973
See application file for complete search history.

(56) References Cited

U.S. PATENT DOCUMENTS

| 4,086,632 | A  | * | 4/1978  | Lions ......................... 701/210 |
| 6,006,331 | A  | * | 12/1999 | Chu et al. ..................... 726/5  |
| 6,236,913 | B1 | * | 5/2001  | Bomans et al. ................. 701/3  |
| 6,618,652 | B2 | * | 9/2003  | Lafon et al. .................... 701/3  |

(Continued)

FOREIGN PATENT DOCUMENTS

DE    19906955 C1 * 10/2000

(Continued)

OTHER PUBLICATIONS

Flight mishap prevention for UAVs; Colgren, R.D.; Johnson, T.L; Aerospace Conference, 2001, IEEE Proceedings;vol. 2, Mar. 10-17, 2001 pp. 2/2647-2/656 vol. 2; Digital Object Identifier 10.1109/AERO.2001.931244.*

(Continued)

*Primary Examiner*—Cuong H. Nguyen
(74) *Attorney, Agent, or Firm*—Lowe Hauptman Ham & Berner, LLP

(57) ABSTRACT

This onboard flight management system displays on the navigation screen the plots of the flight plan parts corresponding to the navigation procedures whose names are displayed on the MCD console during the introduction by the crew of the aircraft, by means of the MCD console, of the elements allowing the FMS flight management computer to plot a flight plan. This facilitates the task of the crew when choosing navigation procedure since the plot of the flight plan part corresponding to a navigation procedure is much more expressive than the name of the procedure.

3 Claims, 2 Drawing Sheets

U.S. PATENT DOCUMENTS

| | | | |
|---|---|---|---|
| 7,389,161 B2 * | 6/2008 | Csik et al. | 701/3 |
| 2005/0228550 A1 * | 10/2005 | Csik et al. | 701/3 |
| 2006/0142904 A1 * | 6/2006 | Caillaud et al. | 701/3 |
| 2007/0050098 A1 * | 3/2007 | Caillaud | 701/3 |
| 2007/0088492 A1 * | 4/2007 | Bitar et al. | 701/120 |

FOREIGN PATENT DOCUMENTS

| | | | |
|---|---|---|---|
| EP | 0 763 714 A | | 3/1997 |
| FR | 2 748 145 A | | 10/1997 |
| JP | 409035103 A | * | 2/1997 |
| JP | 02002357419 A | * | 12/2002 |
| JP | P200415198 A | * | 5/2004 |
| RU | 2270471 C1 | * | 2/2006 |
| WO | 02/25213 A | | 3/2002 |

OTHER PUBLICATIONS

A control system development environment for AURORA's semi-autonomous robotic airship; de Paiva, E.C.; Bueno, S.S.; Gomes, S.B.V.; Ramos, J.J.G.; Bergerman, M.; Robotics and Automation, 1999. Proceedings. 1999 IEEE International Conference on; vol. 3, May 10-15, 1999 pp. 2328-2335 vol. 3; Digital Object Identifier 10.1109/ROBOT.1999.770453.*

Decision support for the general aviation pilot;Painter, J.H.; Kelly, W.E., III.; Trang, J.A.; Lee, K.A.; Branham, P.A.; Crump, J.W.; Ward, D.T,; Krishnamurthy, K.; Woo, D.L.Y.; Alcorn, W.P.; Robbins, A.C.; Ren-Jye Yu;Systems, Man, and Cybernetics, 1997. 'Computational Cybernetics and Simulation'., 1997 IEEE International Conference on vol. 1.*

Timing tasks—a concept to reduce operator's worklaod in complex missions; Romahn, S.; Schafer, D.; Human Interaction with Complex Systems, 1996. HICS '96. Proceedings., Third Annual Symposium on Aug. 25-28, 1996 pp. 81-88; Digital Object Identifier 10.1109/HUICS.1996.549496.*

Closed-loop HIRF experiments performed on a fault tolerant flight control computer; Belcastro, C.M.; Digital Avionics Systems Conference, 1997. 16th DASC., AIAA/IEEE vol. 1, Oct. 26-30, 1997 pp. 4.1-40-54 vol. 1; Digital Object Indentifier 10.1109/DASC.1997.635062.*

A Vision System for Precision MAV Targeted Landing; Edwards, B.; Archibald, J.; Fife, W.; Lee, D.J.; Computational Intelligenece in Robotics and Automation, 2007. CIRA 2007. International Symposium on; Jun. 20-23, 2007 pp. 125-130.*

* cited by examiner

ON-BOARD FLIGHT MANAGEMENT SYSTEM FOR AIRCRAFT

CROSS-REFERENCE TO RELATED APPLICATIONS

The present Application is based on International Application No. PCT/EP2004/050179, filed on Feb. 20, 2004, which in turn corresponds to FR 03/03894 filed on Mar. 28, 2003, and priority is hereby claimed under 35 USC §119 based on these applications. Each of these applications are hereby incorporated by reference in their entirety into the present application.

FIELD OF THE INVENTION

The present invention relates to the customization, by the crew of an aircraft, of an onboard flight management system.

DESCRIPTION OF RELATED ART

The items of flight equipment of an aircraft are split into three levels as a function of their positions in the chain of actuation of the moving surfaces and engines. The first level consists of the flight controls acting directly on the actuators of the moving surfaces and engines. They allow manual piloting. The second level consists of the automatic pilot and/or flight director which act on the flight controls, directly for the automatic pilot and by way of the pilot for the flight director, and which allow the pilot to steer the aerodyne with reference to a quantity related to the trajectory of the aerodyne: attitude, heading, slope, route, altitude, speed, deviations with respect to routes, etc. The third level consists of the flight management computer which acts on the automatic pilot and/or flight director and which allows the pilot to plot a flight plan and to more or less automatically track the flight plan adopted.

The crew acts directly on the flight controls and conducts a dialog with the automatic pilot and/or flight director and with the flight management computer by way of four man/machine interfaces:

- a primary flight display PFD screen. This PFD screen is often designated the artificial horizon. It gives indications on the attitude of the aircraft with respect to a terrestrial frame and on other significant flight parameters such as the altitude, the ascent speed, etc.,
- a navigation display ND screen which advises with regard to the route followed by the aircraft, by displaying a more or less detailed aerial map of the region overflown,
- a control panel with switches, buttons, displays and indicator lights called the MCP (the acronym standing for "Module Control Panel") or FCU (the acronym standing for "Flight Control Unit"). This MCP/FCU control panel generally placed as a banner at the bottom of the windscreen of the flight cabin promotes ease of use. It serves for the control of the automatic pilot and/or flight director, as well as for the supervision of the way in which the flight management computer acts on the automatic pilot and/or flight director. As it promotes ease of use, it only allows the selection and customization of the main modes of operation of the automatic pilot and/or flight director: holding of attitude, of heading, of slope, of altitude, of speed, of route or of deviation with respect to a route, etc. and
- a console with keyboard and screen, termed the MCD or MCDU (the acronyms standing for "Multi Purpose Control Unit"). This MCD console resembles a pocket calculator or an electronic diary. It is usually placed on the central armrest of a flight cabin with two piloting stations side by side. It promotes fineness of supervision and is shared between the automatic pilot and/or flight director, the flight computer and more generally all the onboard equipment requiring customization, which equipment it makes it possible to control and to adjust in detail. The crew uses it to provide the flight management computer with the markers that it needs in order to plot the flight plan.

The plotting of a flight plan by a flight management computer is done on the basis of a trajectory skeleton consisting of turning points associated with various constraints of heading, of altitude, of speed, etc, introduced explicitly or implicitly by the crew by means of the MCD console. By applying programmed construction rules, the flight management computer constructs a trajectory to be followed, on the basis of a chain of segments linking the turning points together in pairs from the starting point up to the finishing point and of circular arc transitions at the level of the turning points for the changes of heading between segments.

In the geographical zones with heavy air traffic and in the environs of airports, the air traffic is subject to regulations termed navigation procedures, limiting the possibilities of plotting a trajectory and the manner of traversing it. Three categories of navigation procedures are customarily distinguished:

- the so-called SID navigation procedures (the acronym standing for "Standard Instrument Departure") which define the trajectories permitted on take off in the zone of proximity to an airport,
- the navigation procedures designated by the term "Airway" which define airways above a territory,
- the so-called STAR navigation procedures (the acronym standing for "Standard Terminal Arrival Route") which define the trajectories permitted on the approach to an airport.

These categories are not limiting and are given merely by way of example.

To facilitate their work, the crews of aircraft have at their disposal a so-called NavDB navigation database (the acronym standing for "Navigation Database"), loaded onboard, accessible from the flight management computer, storing in individual files with the names of the navigation procedures that the aircraft may be required to comply with in its usual space of deployment the signposts necessary for the flight management computer to plot a flight plan portion in accordance with the intended navigation procedure.

The introduction by the crew of the plotting data for a flight plan into the flight management computer, by way of the MCD console, may be done in a more or less global manner. It may consist:

- either of a simple selection of a pre-programmed flight plan from among a choice of stored flight plans, the flight plan selected possibly forming the subject of a pointwise modification so as to make it tally better with the mission of the aircraft,
- or of a selection, from a departure path complying with an SID navigation procedure, followed by a selection of routes leading to the destination airport and complying with one or more Airway navigation procedures and of a selection of a STAR arrival path at the destination airport complying with an Approach navigation procedure,
- or in inputting in detail the various turning points and the associated constraints,
- or else of a mixture of the various aforesaid methods.

When the crew is required to introduce a navigation procedure into the flight plan plotting data, they must previously have flagged the name of the procedure in question from among the names of all those made available to it by the navigation database NavDB. This flagging is facilitated by the programming of the MCD console which, in such a situation, offers the crew possible choices from among the names of the procedures catalogued in the navigation database NavDB, after elimination, by pre-sorting, of the navigation procedures that are inapplicable on account of their type or of the location of the geographical place from which the procedure must be applied. However even reduced to an operation of choosing from among the names of several navigation procedures displayed by the MCD console, the flagging of a navigation procedure to be introduced into the flight plan plotting data may pose problems since the navigation procedure names proposed on selection by the MCD console are often inexpressive and compel a crew unaware of their significance to resort to aerial maps or to a directory of navigation procedures.

The present invention is aimed at making it easier for crews to choose navigation procedures that they are required to undertake during the plotting of a flight plan by a flight management computer.

SUMMARY OF THE INVENTION

Its subject is an onboard flight management system for aircraft comprising a flight management computer coupled to a navigation database, to a navigation screen and to a data input and display console, the flight management computer ensuring the plotting of a flight plan on the basis of data introduced by means of the data input and display console, the navigation database incorporating the plotting elements necessary for the flight management computer to plot flight plan parts satisfying various navigation procedures that the aircraft may have to comply with and the data input and display console making reference to navigation procedures by way of identifiers, noteworthy in that, when a navigation procedure catalogued in the navigation database is mentioned by its identifier on the data input and display console, the flight management computer depicts on the navigation screen the corresponding plot of the flight plan part, indexed by the identifier of said navigation procedure.

This display, on the navigation screen, of the plot of the flight plan part corresponding to a navigation procedure, indexed by the identifier of the navigation procedure doubling up a mention of the identifier of the navigation procedure on the display of the data input and display console, allows the crew, who know the general orientation of the flight plan currently being plotted, to assess at a glance the most suitable navigation procedure from among those proposed on the display of the MCD console.

Advantageously, the flight management computer constructs the flight plan parts, which correspond to navigation procedures and which it displays on the navigation screen, on the basis of the plotting elements contained in the navigation database.

Advantageously, the plots of flight plan parts which correspond to navigation procedures and which are displayed on the navigation screen are extracted from an image bank.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will emerge from the following description of an embodiment given by way of example. This description will be offered in conjunction with the drawing in which.

a FIG. 1 represents the customary configuration of a flight management system for aircraft, and a FIG. 2 represents a display on an MCD console offering a choice from among several navigation procedures of SID type and the image displayed correspondingly on the ND navigation screen by a flight management system in accordance with the invention.

Figure 1:
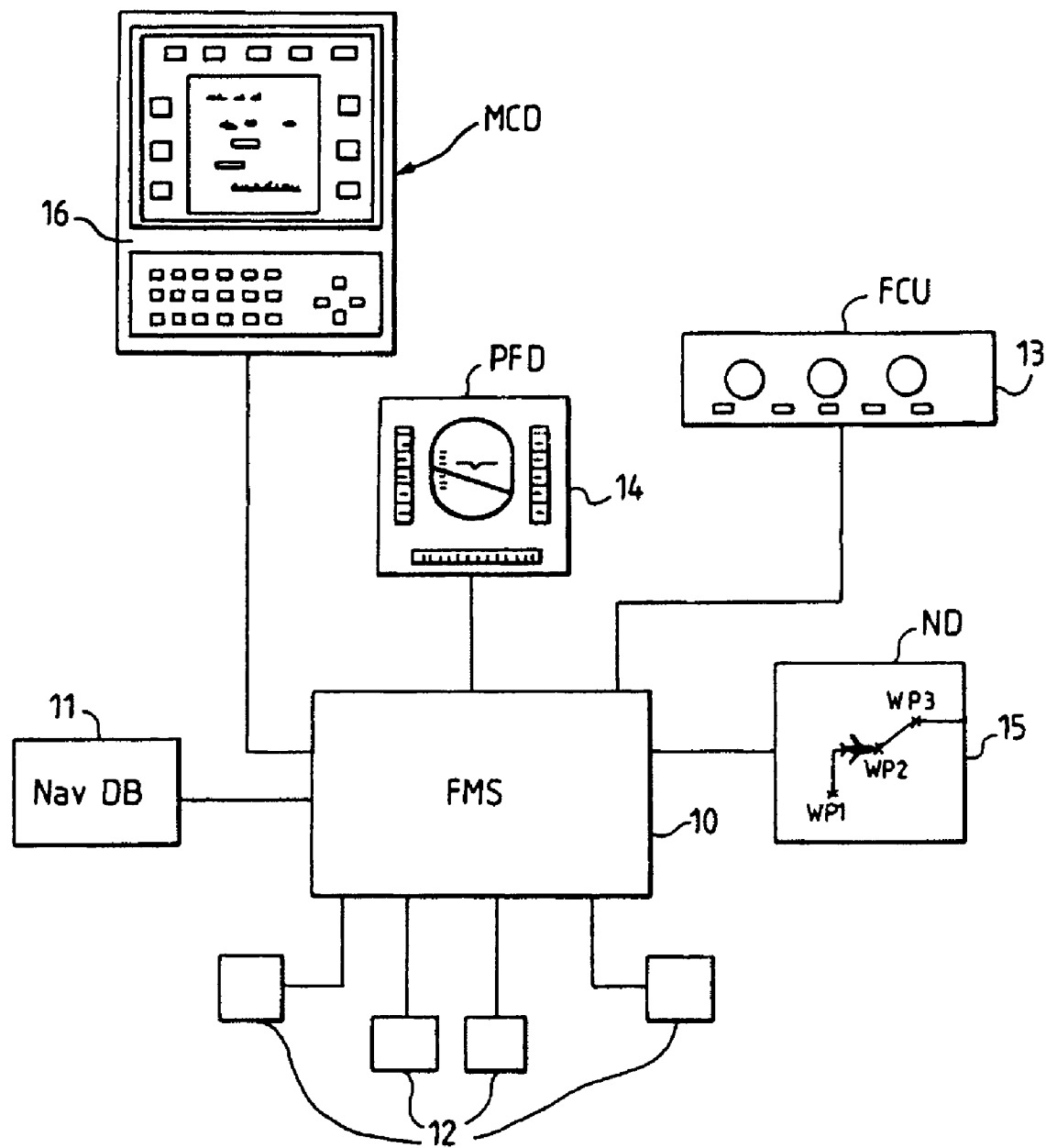
As shown in FIG. 1, an onboard flight management system comprises a flight management computer FMS 10.

The latter exchanges various information with a navigation database 11 and with other equipment 12 of the aircraft, and communicates with the crew of the aircraft by way of man/machine interfaces among which are found mainly:

a control panel FCU 13 with switches, buttons, displays and indicator lights allowing the selection and customization of the main modes of operation of the FMS computer 10 and of the automatic pilot and/or flight director on which the computer FMS 10 acts but which is not represented so as not to needlessly overload FIG. 1, a primary flight display screen PFD 14 used to display an artificial horizon, and flight parameters such as the altitude of the aircraft, its attitude, its speed factor, an indication of guidance mode, etc., a navigation screen ND 15 for displaying maps, the flight plan, etc.

an MCD data input and display console 16 having a keyboard and a screen surrounded by function keys, and constituting the main instrument of dialog with the FMS computer 10.

DETAILED DESCRIPTION OF THE INVENTION

The FMS computer 10 assists the crew of an aircraft in the definition of the flight plan before takeoff and in the tracking of the flight plan from takeoff to landing. Its assistance in the definition of the flight plan consists in simplifying for the crew the plotting, in the horizontal and vertical planes, of the trajectory that the aircraft will have to follow in order to fulfill its mission while reducing this plotting operation, for the crew, to merely the definition of a trajectory skeleton formed of a succession of turning points associated with constraints of altitude, of speed, of heading or the like. During the preparation of the flight plan, the crew inputs into the FMS computer 10, by means of the MCD console 16, in an explicit or implicit manner, the geographical coordinates of the turning points and the constraints associated therewith, and obtains from the FMS computer 10 a flight plan constructed on the basis of a chain or segments linking the turning points together in pairs from the departure point to the destination point and of arcs of a circle providing for the transitions of heading between segments at the level of the turning points, which flight plan is displayed on the navigation screen ND 15 so as to allow the crew to verify its relevance.

The MCD console 16 allows the crew to introduce a flight plan's plotting data into the FMS computer 10, either at the elementary level of the turning points and of the associated constraints, or at the intermediate level of the navigation procedures which make it possible to re-enter into the FMS computer 10 interesting plotting data sequences for the flight plan portions stored in the navigation database NavDB 11, or else, at the global level of the flight plan itself, by calling upon the plotting data for an already stored flight plan.

Figure 2:
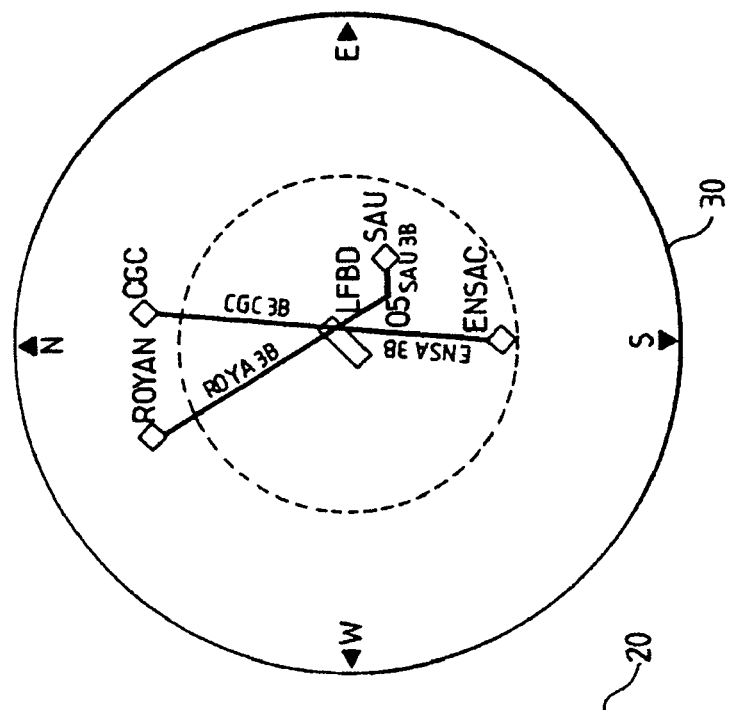
Figure 2:
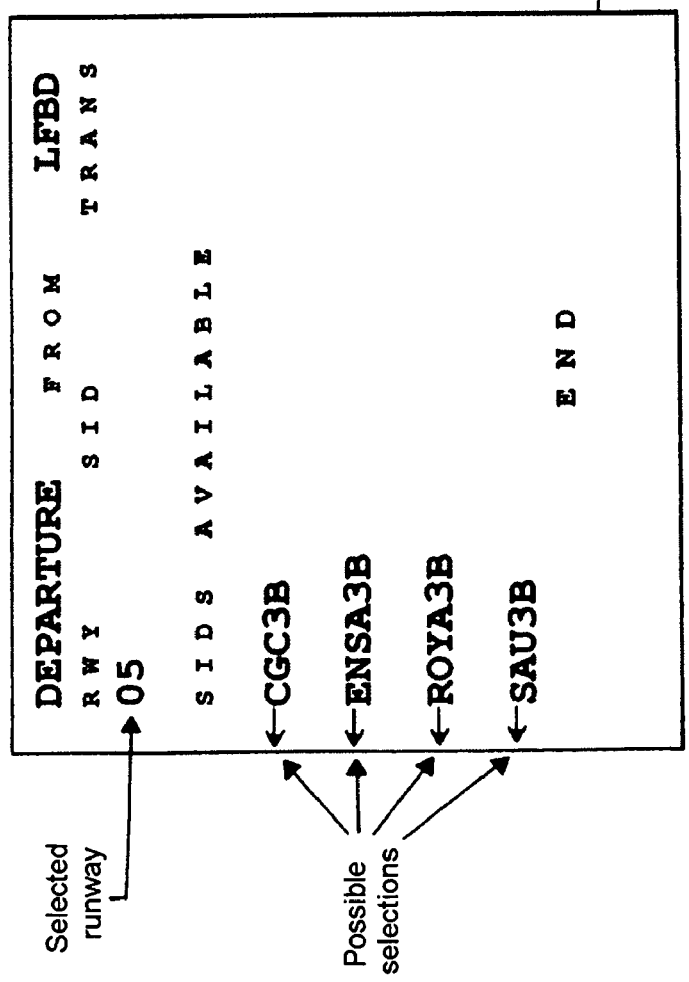

When the crew wishes to introduce a navigation procedure into a flight plan's plotting data, they activate by actuating the appropriate button or buttons of the MCD console 16 a navigation procedure entry program. This entry program asks to be advised as to the geographical location of the point of implementation of the navigation procedure, airport, beacon site, landmark duly mentioned on an aerial map, etc., more generally, any point known as a "waypoint" and regarding the type of navigation procedure concerned and then proposes on the display of the MCD console 16 the names of the navigation procedures catalogued in the navigation database NavDB 11 having the desired type and a zone of application covering the point of implementation indicated by the crew. FIG. 2 illustrates, in a square 20, the display of the MCD console 16 while the crew is seeking to introduce into the flight plan's plotting data a navigation procedure of SID type defining a route on takeoff from the runway 5 of the airport LFBD (Bordeaux Mérignac). This display brings up four possible navigation procedures, named respectively CGC3B, ENSA3B, ROYA3B, SAU3B. Each of these navigation procedures defines a trajectory authorized by the air regulations for exiting the vicinity of the airport LFBD. The CGC3B navigation procedure defines a trajectory at takeoff heading for the Cognac CGC beacon located to the north of the Bordeaux Méerignac LFBD airport. The ENSA3B procedure defines a trajectory on takeoff heading for the ENSAC waypoint located to the south of the Bordeaux Mérignac LFBD airport. The ROYA3B navigation procedure defines a trajectory at takeoff heading for the town of Royan located to the north north-west of the Bordeaux Mérignac LFBD airport. The SAU3B navigation procedure defines a route on takeoff heading for the Sauveterre SAU beacon located to the southeast of the Bordeaux Mérignac LFBD airport. These four trajectories lead the aircraft in very different directions. It is obvious that the crew of the aircraft is interested in choosing the one which leaves the aircraft on the heading which comes as close as possible to that of its final destination but merely the names of the navigation procedures that appear on the display of the MCD console 16 do not allow them to steer their choice. They therefore need to know the corresponding trajectories and hence, if they are not from the region, to consult an aeronautical map or a paper directory detailing the navigation procedures.

It is proposed that the navigation screen ND 15 be used during the introduction of the flight plan's plotting data by the crew to display the portions of flight plan corresponding to the navigation procedures whose names appear on the display of the MCD console 16, while indexing these portions of flight plan by the names of the navigation procedures to which they correspond as is shown in FIG. 2 in a circle 30 representing the outline of the navigation screen ND 15. When the crew are offered on the display of the MCDU console 16 a choice from among several navigation procedures, they can turn towards the navigation screen ND 15 (circle 30 of FIG. 2) to see the plots of the trajectories corresponding to the various navigation procedures proposed, decide on the most advantageous by its output heading or its form, and flag the name of the navigation procedure to which it corresponds, thereafter returning to the MCD console 16 and selecting said navigation procedure.

To carry out this display on the navigation screen ND 15, the FMS computer 10 must know the navigation procedure choices displayed by the MCD console 16. On the basis of this knowledge that it already has if it is responsible for the program for entering plotting data or which is communicated to it by the MCD console 16 if the latter is in charge of the plotting data entry program, the FMS computer 10 will search through the onboard navigation database NavDB 11 for the plotting elements corresponding to each navigation procedure mentioned by its name on the display of the MCD console 16, plots the corresponding portions of flight plan and displays them on the navigation screen ND 15 while indexing them by the names of the navigation procedures.

As a variant, the plots of the portions of flight plan corresponding to the various navigation procedures catalogued in the onboard navigation database NavDB 11 may be stored in an onboard image bank that the FMS computer 10 will consult as needed.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An onboard flight management system for aircraft comprising a flight management computer coupled to a navigation database, to a navigation screen and to a data input and display console, the flight management computer ensuring the plotting of a flight plan on the basis of data introduced by means of the data input and display console, the navigation database incorporating the plotting elements necessary for the flight management computer to plot flight plan parts satisfying various navigation procedures that the aircraft may have to comply with, some of these navigation procedures being subject to regulations and the data input and display console making reference to the navigation procedures subject to regulation by way of identifiers, wherein said flight management computer depicts, during the introduction of the flight plan's plotting data, on the navigation screen, the plots of a flight plan part corresponding to a navigation procedure subject to regulations catalogued in the navigation data base when its identifier is mentioned on the data input and display console.

2. The system as claimed in claim 1, wherein the flight management computer constructs the plots of flight plan parts, which correspond to navigation procedures and which it displays on the navigation screen, on the basis of the plotting elements contained in the navigation database.

3. The system as claimed in claim 1, wherein the flight management computer extracts from an image bank the plots of flight plan parts which correspond to navigation procedures and which it displays on the navigation screen.

* * * * *